United States Patent [19]

Bird et al.

[11] 4,370,249
[45] * Jan. 25, 1983

[54] FIRE-RETARDANT CELLULOSE INSULATION AND METHOD OF PRODUCTION

[75] Inventors: Thomas O. Bird, Idaho Falls, Id.; Jack White, 372 N. 3rd West, Rigby, Id. 83442; Carl H. Bird, Idaho Falls, Id.

[73] Assignees: Jack E. White, Rigby; Franklin N. Smith, Jr., Idaho Falls, both of Id.

[ * ] Notice: The portion of the term of this patent subsequent to Oct. 28, 1997, has been disclaimed.

[21] Appl. No.: 167,271

[22] Filed: Jul. 9, 1980

Related U.S. Application Data

[63] Continuation-in-part of Ser. No. 961,088, Nov. 15, 1978, Pat. No. 4,230,585.

[51] Int. Cl.³ .................... C04B 43/12; C09K 3/28
[52] U.S. Cl. ............................. 252/62; 106/18.12; 106/204; 162/159; 252/602; 252/607
[58] Field of Search .................. 252/607, 602, 62; 106/18.12, 204; 162/159

[56] References Cited

U.S. PATENT DOCUMENTS

| | | | |
|---|---|---|---|
| 1,932,807 | 10/1933 | Valdastri | 106/204 |
| 3,278,383 | 10/1966 | White et al. | 424/362 X |
| 3,458,327 | 7/1969 | Fraser | 252/602 X |
| 3,558,486 | 1/1971 | Morgenthaler | 252/2 X |
| 4,089,785 | 5/1978 | Johnson | 252/608 |
| 4,230,585 | 10/1980 | Bird et al. | 252/607 |

FOREIGN PATENT DOCUMENTS

| | | | |
|---|---|---|---|
| 454507 | 2/1949 | Canada | 162/159 |
| 748236 | 6/1933 | France | 424/69 |

*Primary Examiner*—Richard D. Lovering
*Attorney, Agent, or Firm*—H. Ross Workman; J. Winslow Young; Allen R. Jensen

[57] ABSTRACT

A fire-resistant, cellulose insulation and method, the cellulose insulation including a predetermined quantity of talc to impart the desired degree of fire-resistant characteristics to the cellulose. Predetermined quantities of boron compounds can be added with the talc to improve the fire-suppressant characteristics of the insulation. The method includes directing ground cellulose from the primary grinding stage into a surge bin to accommodate metering the talc with the cellulose to thereby assure the appropriate distribution ratio of talc in the cellulose.

4 Claims, 1 Drawing Figure

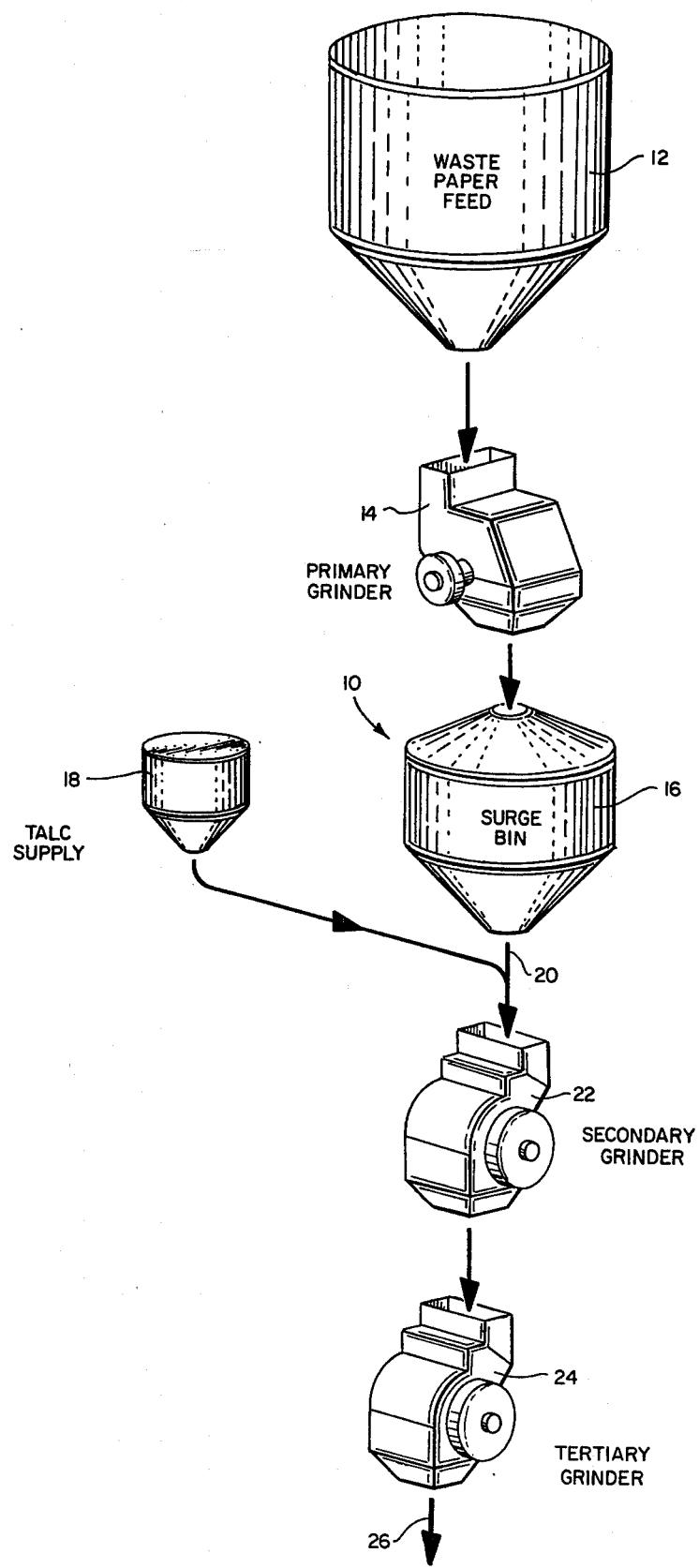

FIRE-RETARDANT CELLULOSE INSULATION AND METHOD OF PRODUCTION

BACKGROUND

1. Field of the Invention

This invention relates to a cellulose insulation product and method and, more particularly, to a fire-resistant, cellulose insulation product and method wherein talc, in combination with a boron compound, is intimately blended with the cellulose to impart the necessary fire-resistant characteristics to the cellulose.

2. Related Applications

This application is a continuation-in-part application of copending application Serial No. 961,088 filed Nov. 15, 1978 which issued as U.S. Pat. No. 4,230,585 on Oct. 28, 1980.

3. The Prior Art

Recent events relating to the availability and cost of fuels has resulted in an increased interest in insulation products for structures such as dwellings and the like. The primary feature of any insulation is the ability to impede conductive and convective heat losses by forming minute air pockets in a nonconductive or low thermal conductive matrix. The air pockets create an effective dead air space or barrier gainst the conductive and convective heat losses.

A finely divided cellulose material has been found to be extremely useful as an insulation product since the cellulose has very low thermal conductivity and can be shredded or otherwise finely divided to provide the desirable air entrapment characteristics. Suitably treated, the cellulose also maintains a desired degree of dimensional stability referred to in the trade as "loft." Additionally, insulation-quality cellulose is readily available from recycled cellulose products such as newsprint, cardboard and kraft paper. These raw materials are readily recoverable from the waste disposal systems of most communities.

However, cellulose is carbonaceous and a finely divided cellulose product is, therefore, extremely flammable in view of the enormous surface area exposed for combustion. Accordingly, it has been conventional to mix a predetermined quantity of a fire-resistant and/or fire-suppressant material such as a boron compound with the cellulose. The boron compounds generally include boric acid, borax and borates.

Additionally, certain cellulose insulation products have included ammonium sulfate as the fire-resistant and/or fire-suppressant material. However, ammonium sulfate is believed to be deleterious since it combines with moisture to form acidic byproducts which have been found to cause corrosive damage to electrical wiring, etc. Accordingly, recent governmental regulations have required the discontinuance of cellulose insulation products incorporating ammonium sulfate as the fire-resistant and/or fire-suppressant material.

Although cellulose insulation is used only in sheltered locations, exposure to atmospheric moisture is of considerable importance. Conventionally, cellulose insulation is incorporated in a dwelling as an overlayment in the attic above the ceiling and is blown in place. Cellulose insulation has the added advantage of being fluffed by the action of the blowing process. Most attics are ventilated and include exhaust systems from bathrooms, range hoods and the like being directed into the attic space for subsequent dispersal to the atmosphere through the attic ventilation system. Accordingly, moisture in the heavily moisture-laden air from a bathroom or range hood tends to condense on the exposed insulation on cold days. This condensation has been found to form the acidic byproducts from ammonium sulfate resulting in its being proscribed by governmental regulations.

Additionally, other fire-resistant compounds that are soluble are known to "migrate" under the effect of moisture. This migration results from the periodic solubilization upon moisture condensation followed by recrystallization upon subsequent moisture evaporation so that the solubilized compounds are removed from portions of the cellulose. The exposed cellulose is thereby deprived of its fire-resistant protection with a resulting, potentially dangerous condition.

The production of a fire-resistant, cellulose insulation material also requires extensive grinding and mixing of the fire-resistant materials with the cellulose insulation. While various fire-resistant and/or fire suppressant materials have been tried, these materials generally tend to be abrasive to the grinding equipment resulting in excessive equipment wear with corresponding downtime and production loss.

In view of the foregoing, it would, therefore, be a significant advancement in the art to provide a fire-resistant, cellulose insulation material which is (1) relatively available as a raw material and, therefore, relatively inexpensive to obtain, (2) inert to occasional contact with condensation, and (3) low in abrasion of grinding equipment. Such a fire-resistant cellulose insulation material and method is disclosed and claimed herein.

BRIEF SUMMARY AND OBJECTS OF THE INVENTION

The present invention relates to a novel, fire-resistant, cellulose insulation product wherein talc is incorporated with the cellulose in combination with a boron compound to impart desired fire-resistant characteristics to the cellulose. The talc is introduced into the cellulose during the grinding process and the known, relatively low hardness of the talc minimizes machinery abrasion. Talc is also abundantly available as earthen deposits so that it is less expensive to use than conventional boron compounds alone.

It is, therefore, a primary object of this invention to provide improvements in fire-resistant, cellulose insulation.

Another object of this invention is to provide an improved method for producing a fire-resistant, cellulose insulation material.

Another object of this invention is to provide a fire-resistant, cellulose insulation material wherein talc provides some of the fire-resistant characteristic to the insulation.

Another object of this invention is to provide a fire-resistant, fire-suppressant, cellulose insulation material wherein at least one boron compound is amended to the talc for improved fire-suppressant characteristics.

Another object of this invention is to provide a fire-resistant cellulose insulation material wherein the fire-resistant material has low abrasive characteristics to reduce equipment wear.

These and other objects and features of the present invention will become more fully apparent from the following description and appended claims taken in conjunction with the accompanying drawing.

BRIEF DESCRIPTION OF THE DRAWING

The figure is a schematic flow diagram for one presently preferred embodiment for practicing the method of this invention.

DETAILED DESCRIPTION OF THE PREFERRED EMBODIMENTS

The invention is best understood by reference to the drawing wherein like parts are designated with like numerals throughout.

GENERAL DISCUSSION

Talc is a naturally occurring magnesium silicate ($3MgO \cdot 4SiO_2 \cdot H_2O$) and is frequently referred to by various names including, for example, talcum, soapstone, rensselaerite, potstone, steatite and French chalk. Advantageously, talc is one of the softer minerals and has a hardness of between 1.0 and 1.5 in terms of the Mohs' Scale. Talc is also relatively insoluble in water and a finely divided talc will resist wetting and thus tend to float on water. Since talc is a combination of the oxides of magnesium and silicon, talc will not support combustion. A representative analysis of the composition of talc obtained from a commercial mining operation is set forth in Table I, below.

TABLE I

| ANALYSIS OF MINE GRADE TALC | |
|---|---|
| Compound | Weight % |
| MgO | 29.0 |
| $SiO_2$ | 62.5 |
| $Al_2O_3$ | 1.9 |
| $Fe_2O_3$ | 1.9 |
| $TiO_2$ | 0.15 |
| $K_2O$ | 0.09 |
| CaO | 0.005 |
| Weight Loss On Heating | 5.5 |

The weight loss on heating is believed to represent water loss. Water loss does not interfere with the fire-resistant characteristics imparted by the talc. On the contrary, it is believed that the water loss on heating contributes to the fire-resistant characteristics of the cellulose insulation since the water thus liberated tends to absorb a portion of the thermal energy which would otherwise tend to char or coke the cellulose. Surprisingly, it was discovered during the development of the present invention that talc, when intimately mixed with a highly combustible material such as finely divided cellulose, was found to be even more effective as a fire-resistant material than the conventional boron compounds or ammonium sulfate alone. This is believed to be a result, in part, of the foregoing tendency for the water molecule portion of the talc to absorb and remove a portion of the thermal energy which would otherwise char the cellulose. This was experimentally demonstrated when a sample of the fire-resistant, cellulose of this invention was subjected to the flame of a blow torch with minimal thermal degradation. This latter characteristic is particularly useful since any carbonaceous material will tend to coke upon the application of heat, the coking process producing highly combustible gases such as carbon monoxide, methane and the like. Accordingly, a fire-resistant material such as talc is particularly advantageous when incorporated with a highly combustible material such as finely divided cellulose.

Another surprising discovery made as a result of this invention is that the talc is not only insoluble but appears to impart a desirable degree of hydrophobicity to the cellulose insulation material. Being insoluble, talc has a very low tendency to migrate or otherwise leave the cellulose without fire-resistant protection while, to a lesser extent, the finely divided talc also assists in forming a limited, water-repellant coating on the cellulose.

Additionally, it was discovered that the inherent softness of the talc contributed greatly toward its intimate dispersion throughout the cellulose material while minimizing abrasive wear on the grinding machinery. While, on the other hand, siliceous materials such as perlite tended to cause excessive machinery wear.

The cellulose material useful in this invention may be readily supplied from various sources although the principle source consists of recycled newsprint, cardboard, kraft paper and the like. Newsprint is especially desirable since it provides a certain degree of uniformity to the raw material and may be obtained for a relatively nominal cost per ton.

Although talc alone in amounts between 5% and 25% by weight have been found to impart certain fire-resistant characteristics to cellulose insulation products, recent changes in legislation have resulted in even more stringent standards for fire-resistance and also flame suppression. One test used in the industry is referred to as the Critical Radiant Flux Panel Test and involves a tray (50 cm $\times$ 10 cm) of test cellulose insulation product being exposed to a radiant heater operating at about 1250° F. (677° C.). An open flame is then applied to the insulation product and the length of the combustion zone across the tray is measured as an indicator of the fire-suppressant characteristics of the cellulose insulation additives. For example, a burnout length of 50 cm is taken as a clear indicator of a failure of this particular test. Lesser burnout lengths are thus deemed to indicate various degrees of successful fire-suppressant characteristics for the particular fire-suppressant additives.

The test is intended to duplicate or, more precisely, accelerate attic conditions which would cause degradation of the cellulose insulation material over a twenty-year span prior to its being exposed to an open flame. While talc alone contributes good fire-resistant characteristics and may be found suitable for many applications, as set forth hereinbefore, talc alone was recently found to be less than adequate for cellulose insulation products subjected to the foregoing test. In particular, it is believed that the high temperatures involved cause the cellulose to char and give off combustible gases in spite of the presence of talc. Therefore, it was determined that boron compounds such as boric acid, borax, and borates should be added in amounts up to 20% (by weight) to the insulation and, preferably, in amounts between 10% (by weight) and 20% (by weight).

The following examples were tests performed using the foregoing Critical Radiant Flux Panel Test according to standard operating procedures:

EXAMPLE NO. 1

A finely divided cellulose insulation product was prepared using 23% (by weight) talc and 10% (by weight) boron compound (50% boric acid and 50% borax). The product was exposed to the radiant panel and an open flame. The product failed the requirements of the Critical Radiant Flux Panel Test by having a burnout length of 50 cm.

EXAMPLE NO. 2

The procedure of Example 1 was followed except that the boron compound was increased to 13% (by weight) boron compound (50% boric acid and 50% borax) with the talc remaining at 23% (by weight). The test was marginally successful in that the combustion front advanced only 42 cm.

EXAMPLE NO. 3

The procedure of Examples 1 and 2 was repeated using 19% (by weight) boron compound (50% boric acid and 50% borax) with the 23% talc (by weight). The test was successful in that the combustion front advanced only 34 cm.

These examples clearly illustrate the fire-suppressant characteristics imparted to the fire-resistant characteristics of the talc by the boron compounds.

The Embodiment of the Drawing

With particular reference to the drawing, a flow diagram, shown generally at 10, is schematically illustrated and includes a waste paper feed 12, a primary grinder 14, a surge bin 16, a talc supply 18, a secondary grinder 22, and, where desirable, a tertiary grinder 24. Cellulose from waste paper feed 12 is directed into the primary grinder 14 which reduces the waste paper to a substantially uniform mass of cellulose. Primary grinder 14 is substantially a conventional grinder and is adapted to receive newsprint, cardboard, kraft paper and the like. The ground cellulose from primary grinder 14 is introduced into a surge bin 16.

The function of surge bin 16 is to accommodate the controlled admixing of talc and boron compounds from talc supply 18 with cellulose from primary grinder 14. Surge bin 16 provides a particularly useful function since cellulose is discharged from primary grinder 14 in relatively non-uniformed clumps or masses and in surges. An outlet 20 is provided for surge bin 16 and may be configured in the form of a screw conveyer or the like for the purpose of directing a predetermined quantity of cellulose from surge bin 16 into secondary grinder 22. The rate of feed from talc supply 18 is coordinated with regulator of outlet 20 so as to admix talc and boron compounds with the cellulose on a ratio generally between about 5-25% (by weight) talc and 10-20% (by weight) boron compounds to the cellulose.

Secondary grinder 22 and tertiary grinder 24 are each configurated as high-speed grinders. In one presently preferred embodiment of this invention secondary grinder 22 and tertiary grinder 24 were each configurated as high-speed hammer mills having a tip speed of the hammers of 20,000 feet per minute. Conventional hammer mills were modified and suitably balanced to accommodate this high speed. Advantageously, the relatively softness of the talc did not induce excessive wear of the mechanical equipment of grinders 22 and 24.

Introduction of talc and boron compounds from talc supply 18 prior to the secondary grinder 22 has the additional advantage in that the talc greatly reduces any fire hazard present during the grinding process. For example, newsprint, cardboard, and kraft paper from the waste paper feed frequently contain stones or metallic debris such as staples and the like which encourage spark formation during the high-speed grinding process. However, with the talc and boron compounds present in the grinder, the opportunities for ignition are substantially minimized, thereby contributing significantly to the safety of the grinding process.

In these experimental examples, boric acid and other boron compounds in amounts up to 20% (by weight) were introduced with the talc from talc supply 18 making the total fire-resistant material in the cellulose greater than approximately 25% by weight. Although boric acid, as well as other boron compounds such as borax and borates, are known for their fire-suppressant properties, no increased fire resistance capability could be ascertained by the inclusion of the boron compounds alone therein.

In light of the relatively high grinding speeds, particularly in secondary grinder 22 and tertiary grinder 24, as one phase of the experimental procedure, a nonflammable oil was introduced into the grinding process as a dust suppressant. For example, a commercially available silicone oil was introduced into the grinding process in amounts up to 5% by weight and was found to suppress dust formation. Silicone oil is known also for its resistance to wetting by water. The silicone oil also appeared to enhance the adhesion between the talc and the cellulose material. Excessive dust suppression is not necessarily indicated as being an ultimate goal since a certain amount of talc dust in each of grinders 22 and 24 appears to be desirable for suppression of ignition.

Fire-resistant, cellulose insulation is discharged through outlet 26 from tertiary grinder 24 and was found to have a desirable degree of intermix between the talc and the cellulose. The cellulose was also found to be very finely divided as a result of the high-speed grinding process. Both the intimate dispersion and fine division are a direct result of the high-speed grinding process which is obtainable, in large part, as a result of the very soft nature of talc.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A fire-resistant, cellulose insulation comprising a finely divided cellulose intimately mixed with talc, the talc being present in an amount within the range on the order of about 5% to 25% by weight and wherein a boron compound is added to the talc in amounts ranging up to 20% by weight.

2. The fire-resistant, cellulose insulation defined in claim 1 wherein the boron compound is selected from the group consisting of borax, boric acid, and borates.

3. A method for producing a fire-resistant, cellulose insulation comprising:
   grinding a cellulose raw material in a first grinding stage;
   imparting a fire-resistant characteristic to the cellulose by mixing the ground cellulose with an inorganic material, the inorganic material comprising talc and up to 20% by weight of a boron compound; and
   finely grinding the cellulose and inorganic material mixture thereby providing a substantially uniform distribution of the inorganic material throughout the cellulose.

4. A method for producing a fire-resistant, cellulose insulation comprising:
   subjecting a cellulose material to an initial grinding step;
   introducing the ground cellulose into a surge bin to accommodate a controlled processing of the ground cellulose;
   mixing talc with the ground cellulose in an amount within the range on the order of about 5% to 25% by weight talc to ground cellulose;
   adding a boron compound to the talc in amounts ranging up to 20% by weight; and
   blending the talc and boron compound with the cellulose by subjecting the talc, boron compound and cellulose mixture to additional grinding.

* * * * *